United States Patent [19]

Lee

[11] Patent Number: 5,469,112

[45] Date of Patent: Nov. 21, 1995

[54] COMMUNICATION DEVICE WITH ZERO-CROSSING DEMODULATOR

[75] Inventor: Edward K. B. Lee, Sunrise, Fla.

[73] Assignee: Motorola, Inc., Schaumburg, Ill.

[21] Appl. No.: 290,161

[22] Filed: Aug. 15, 1994

[51] Int. Cl.⁶ .................................................. H04L 27/14
[52] U.S. Cl. .................. 329/302; 329/306; 329/323; 329/346; 375/340
[58] Field of Search ................................... 329/302, 306, 329/308, 346, 323; 375/80

[56] References Cited

U.S. PATENT DOCUMENTS

| | | | |
|---|---|---|---|
| 4,254,503 | 3/1981 | Vance | 375/91 |
| 4,605,903 | 8/1986 | Ihle | 375/80 |
| 4,752,742 | 6/1988 | Akaiwa | 375/88 |
| 5,202,643 | 4/1993 | Sato | 329/310 |

OTHER PUBLICATIONS

IEEE Transactions on Communication Technology, vol. Com–18, No. 2, Apr. 1970, pp. 110–118.

*Primary Examiner*—Siegfried H. Grimm
*Attorney, Agent, or Firm*—M. Mansour Ghomeshi

[57] ABSTRACT

A communication device (100) includes mixers (104) and (108) which mix a local oscillator (112, 106) with a received signal to produce in-phase (i) and quadrature (q) components. The direction of the phase of the signal is detected as it crosses the i and q axes. The direction of the phase rotation is kept track of by a bi-directional counter (123) in order to demodulate multi-level digital signals. A positive rotation increments the bi-directional counter (123). Conversely, a negative direction decrements the counter (123). The final count of the counter (123) is used by a decision device 124 to establish the content of the received information signal.

14 Claims, 3 Drawing Sheets

COMMUNICATION DEVICE WITH ZERO-CROSSING DEMODULATOR

TECHNICAL FIELD

This invention is generally related to communication devices and more particularly to digital communication devices.

BACKGROUND

Many demodulators used in digital communication devices use zero-crossings to determine the polarity of the demodulated signal. In zero IF (Intermediate Frequency) applications, signal phase information can be extracted from the zero crossings of the in-phase and quadrature signals. These zero-crossings are detected by an appropriate circuitry to demodulate the carrier signal and reconstruct the originally transmitted information signal.

In general, digital signals may be demodulated in various ways. In U.S. Pat. No. 4,322,851 issued on Mar. 30, 1982, Ian Vance teaches a method of demodulating a binary FSK signal. This technique uses the direction of the phase rotation angle to detect signal polarity. A significant problem with this approach is its inability to demodulate multi-level digital signals.

To overcome this limitation, a Cross-Differentiate-Multiply (CDM) demodulation technique may be employed. This technique is detailed in an article titled "An FM Detector for low S/N" written by John Park and published in IEEE T-Comm, Vol. com-18, No. 2, April 1970. This technique is highly complicated and requires two differentiators, four multipliers, one divider and two summers. The number of devices, hence their current drain, used to realize this technique is prohibitive particularly in battery operated portable communication applications.

Yet another approach employs the $\tan^{-1}$ (inverse tangent) operation $\{[q(t)]/[i(t)]\}$ with digitized i and q signals. This technique requires two Analog to digital converters and a processor. Once again the current drain is prohibitive, particularly in portable applications.

A demodulation technique is therefore desired that could efficiently demodulate multi-level digital signals.

DETAILED DESCRIPTION OF THE PREFERRED EMBODIMENT

Some digital FSK demodulation schemes estimate transmitted data by estimating a phase rotation direction at zero-crossing points. The performance of such demodulation schemes varies with the number of zero crossing points. An increase in the number of measurements of a phase rotation direction at zero-crossing points improves the performance of the demodulator, and increases the maximum transmit bit rate at a given frequency deviation. An application Ser. No. 08/296,139 titled "COMMUNICATION DEVICE WITH EFFICIENT ZERO-CROSSING GENERATOR" having attorney docket CM01679J and filed concurrently herewith describes a method for increasing the number of zero crossings.

In general, a received signal is converted to zero IF either directly or via multiple conversion stages. Traditionally, the conversion is accomplished via two mixers which produce the in-phase (i) and the quadrature phase (q) signal. The i and q signals are used in the recovery of the transmitted information signal. One technique determines the polarity of the bit by estimating the phase rotation direction. A phase rotation direction may be determined by sampling q waveforms at i zero crossings and i waveforms at q zero-crossing points. Estimating the phase rotation direction in demodulating digital signals is limited to binary applications. The present invention proposes the use of i and q components to demodulate even multi-level digitally modulated signals. In addition to the direction of the phase at zero crossings, the present invention uses a collection of phase rotation angles to estimate the contents of the M-ary signals.

Figure 1:
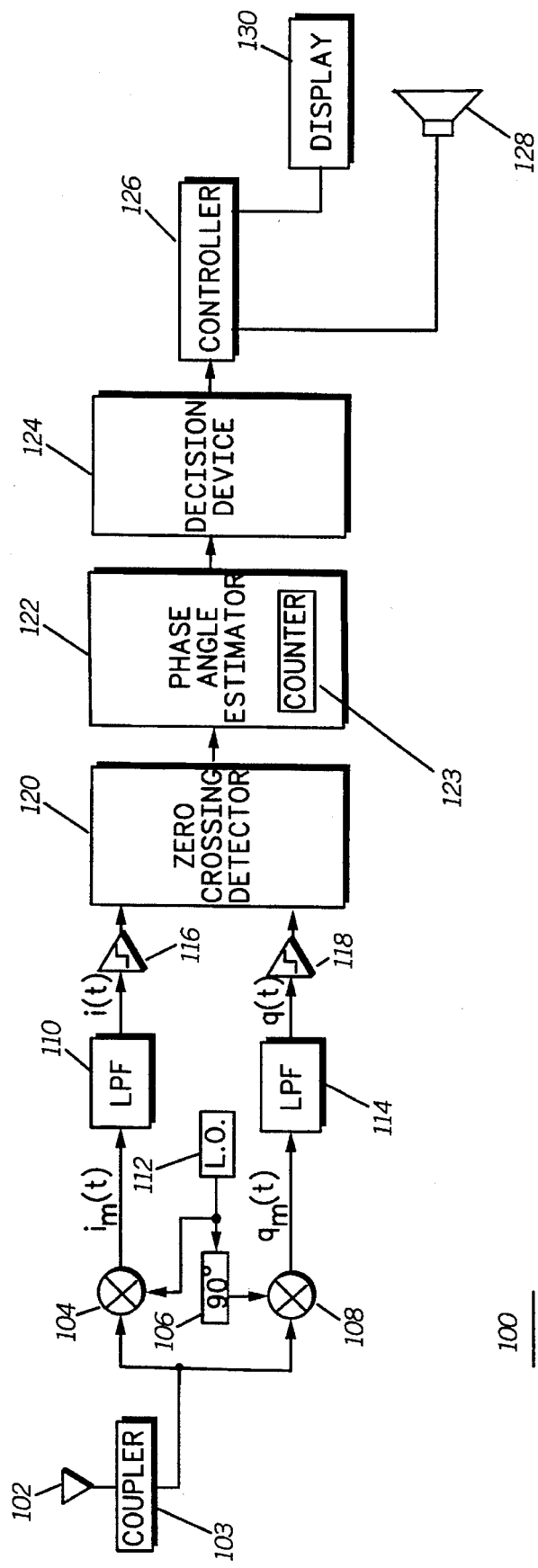
FIG. 1 shows a block diagram of a communication device in accordance with the present invention.

To better understand the principles of the present invention reference is made to the drawings and in particular to FIG. 1. This figure shows relevant portions of a communication device 100 having a differential or zero crossing demodulator. A radio frequency signal, received at the antenna 102 is converted to zero IF via two mixers 104 and 108. Those skilled in the art appreciate that an intermediate conversion stage may be employed before the Zero IF signal is generated. This optional intermediate conversion stage is shown by a coupler 103. An oscillator 112 provides the local oscillator (LO) signal for 104. The local oscillator signal for the mixer 108 is supplied through a 90° phase shifter 106. The output signals of the mixers 104 and 108 are filtered at LPFs 110 and 114 to produce the i and q signals. These signals are limited at limiters 116 and 118 before being applied to a zero crossing detector 120. The detector 120 detects zero crossings using for instance a flip flop with an edge triggered clock input and presents its findings to an estimator 122. The estimator 122 estimates the phase angle rotation via a bi-directional counter 123 which keeps track of the positive and negative phase rotations.

As a tool of explaining the operation of the communication device 100, the signal received at the antenna 102 is assumed to be a CPFSK. Such a signal may be represented as:

$$\cos(\omega_c t + \theta(t))$$

where $$\theta(t) = \frac{\pi h}{T} \int d(t)dt,$$

T is a symbol time duration, and d(t) is a transmitted data waveform. It is noted that MSK (Minimum Shift Keying) and GMSK (are special cases of CPFSK with a modulation index (h) of 0.5. The phase rotation angle for a CPFSK signal over a symbol time may be described as follows:

$$\Delta\Theta(t) = \theta(t) - \theta(t-T)$$

$$= \frac{\pi h}{T}\left[\int^t d(t)dt - \int^{(t-T)} d(t)dt\right]$$

$$= \frac{\pi h}{T}\int^t_{(t-T)} d(t)dt$$

The above equation indicates that $\Delta\Theta(t)$ may be used to detect d(t). For MSK signals, $\Delta\Theta(t)$ is $\pi/2$ when d(t) is equal to 1, and $-\pi/2$ when d(t) is equal to $-1$ in the absence of noise.

Figure 3:
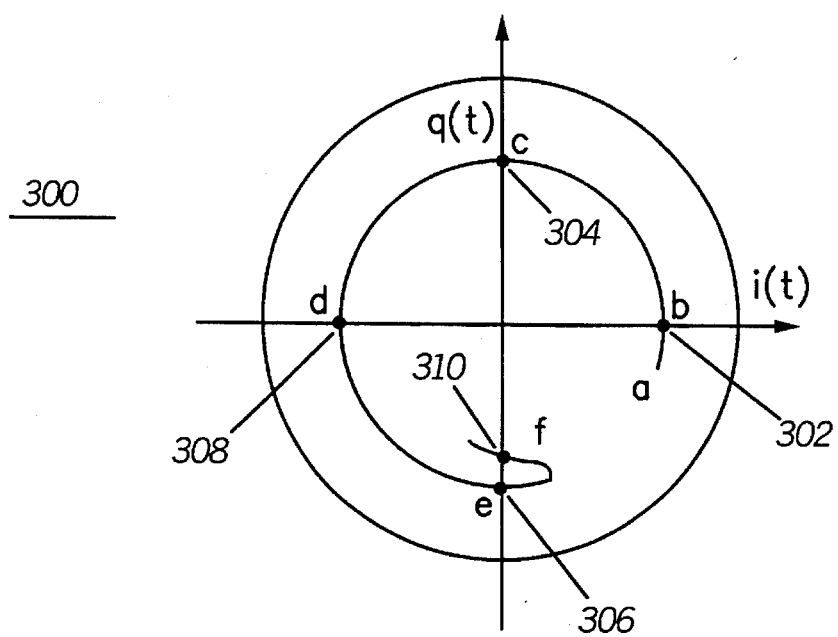
FIG. 3 shows a phase vector diagram depicting the phase rotation direction and zero crossings in accordance with the present invention.

As stated, the preferred embodiment of the demodulator is based on i and q zero crossings. In the phase domain, the detector 120 detects the instantaneous phase rotation at zero crossings. In the time domain, i and q values are monitored at zero crossings of q and i, respectively. Reference is made to the phase diagram 300 as shown in FIG. 3 for a better understanding of the i and q zero crossings. When i waveform goes from positive to negative, or from negative to positive, the phase trajectory in the phase diagram 300 crosses the q axis. q values at i zero crossings indicate the direction of phase rotation. The zero crossings of i and q waveforms may be viewed as the phase crossings of i and q axes in the phase diagram 300. A positive phase axis-crossing means that the phase trajectory crosses i or q axis in a positive direction (counter-clockwise). Similarly, a negative phase axis-crossing means that the phase trajectory crosses i or q axis in a negative direction (clockwise). The zero-crossing detector 120 sets its output high if the phase trajectory crosses i or q axis in a positive direction. A low output is produced when the phase trajectory crosses i or q axes in the negative direction.

As the phase relationship of the i and q waveforms changes the detector 120 detects zero crossings and couples them to the estimator 122. The estimator 122 keeps track of the number of times a positive or negative phase change was detected. This is accomplished via the internal bi-directional counter 123. The counter 123 is incremented when a positive phase rotation (counter-clockwise) is detected. A negative phase rotation decrements the counter 123. The final output of the counter is coupled to a decision device 124 in order to produce the demodulated signal.

Figure 4:
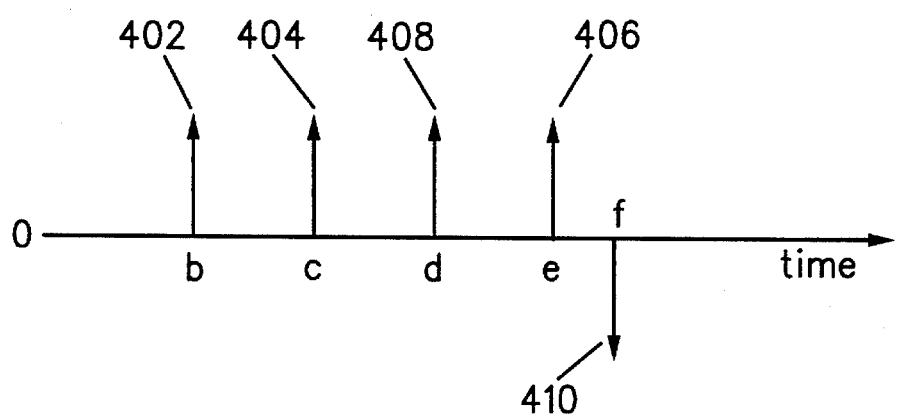
FIG. 4 shows the time representation of the phase rotation diagram of FIG. 3.

To better understand the principles of the present invention concurrent reference is made to the phase diagram 300 and its time equivalent diagram 400 of FIG. 4. In these diagrams the phase rotation from an arbitrary position (a) is traced. The parenthetical designators refer to the diagram 400. A zero crossing in the positive rotation is shown by 302 (402). A second positive zero crossing 304 (404) is encountered at the q axis. The phase diagram continues with a third zero crossing 308 (408). A forth crossing occurs at 306(406). After the forth zero-crossing, the phase rotation makes a directional change and starts a clockwise rotation. A negative zero crossing is encountered at the q axis 310 (410). As can be seen the negative zero crossing is shown by a negative vector on the diagram 400. This is intended to facilitate the understanding of the difference between a positive and negative phase rotation angle. This difference is later captured by the bi-directional counter 123.

Continuing with this example, the output of the counter 123 is a +2 after all the four zero crossings have been captured. The decision device 124 extrapolates the values of diagram 400 to produce a demodulated signal. In an M-ary system a decision table that converts the number of zero crossings to a digital value is referred to in order to determine the digital value of the received signal. Due to the presence of noise, this decision table includes ranges for each detected symbol. The following table provides an example:

1  0° to +180°
2  0° to −180°
3  >+180°
4  <−180

Using this exemplary chart, the device 124 concludes that a "10" was transmitted based on the output of the counter 123 which had a net value of three which translated into a phase rotation angle of 270°. Note that 270° is achieved because there are four positive zero crossings and one negative zero crossing. The combination of these zero crossings amounts to three positive crossings which represents 270°

The received bits are coupled to a controller 126 for further analysis and decoding. The controller 126 proceeds to decode the received signal by combining individual bits and presents the audio portions and data portions therein to a speaker 128 and a display 130, respectively.

A significant benefit of the present invention over the prior art is immediately noticed here. The proposed system is capable of demodulating multi-level digital signals and is not limited just to binary. Demodulation of multi-level signals is now possible since the present invention provides for both the detection of the direction of the phase rotation angle and the number of zero crossings. Indeed, there is no limit to the level of the signal being detected.

It is noted that although the preferred embodiment utilizes rotation angles over a symbol time greater than 90°, it is readily feasible to accommodate signals that have less than 90° phase rotation angle over a symbol time. An example of one such system is GMSK where the phase rotation angle over a symbol time is often less than 90°. In this case, more zero crossings may be generated using summers and subtractors at the output of the mixers 104 and 108. These components combine the mixer outputs to produce additional signals 45° and 135° away from the I signal. Such a scheme provides for two additional phase axes thereby increasing the number of zero crossings by a factor of two. This alternative embodiment is shown in FIG. 2.

Figure 2:
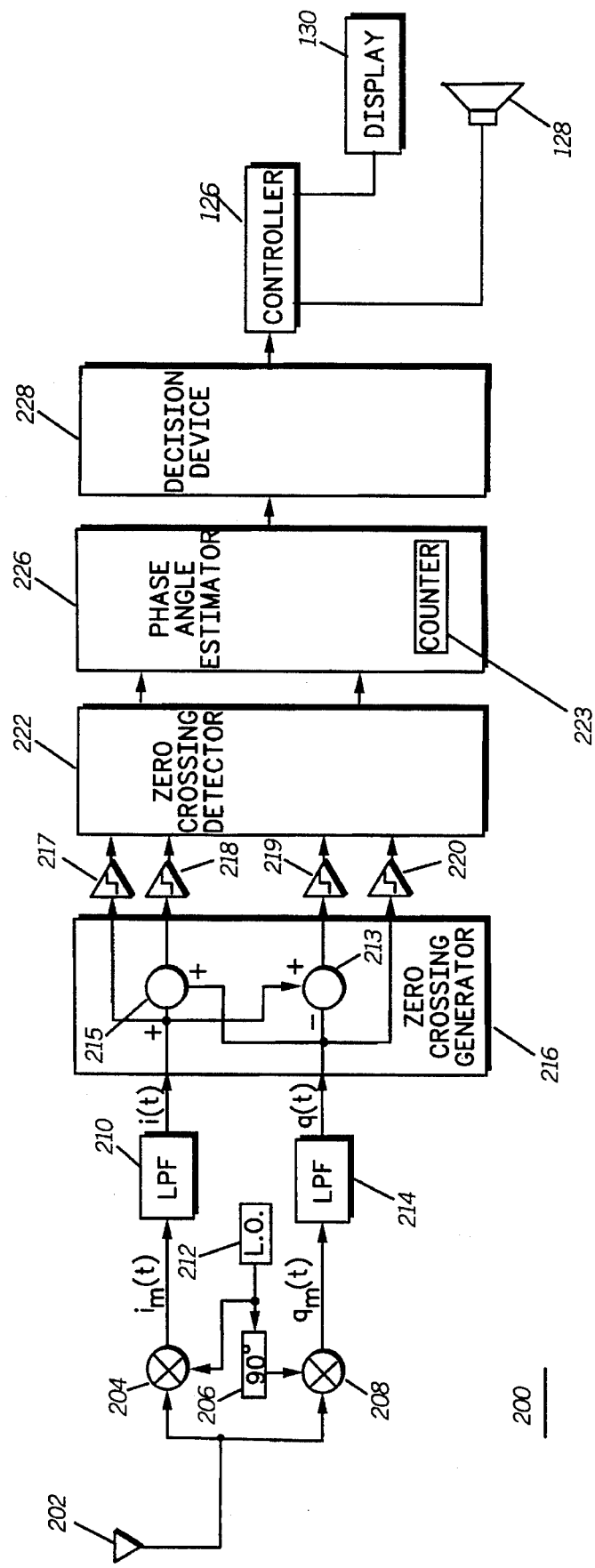
FIG. 2 shows a block diagram of an alternative embodiment of the present invention.

Referring to FIG. 2, a received signal is coupled from an antenna 202 to a pair of mixers 204 and 208. A local oscillator 212 provides local oscillator signal for 204 and 208 directly and through a phase shifter 206, respectively. Low pass filters 210 and 214 remove high frequency components from the mixed outputs to produce the first in-phase and quadrature components i and q, respectively. These two signals are then coupled to an efficient zero-crossing generator 216. This generator 216 manipulates the i and q signals to generate additional zero crossings. In the preferred embodiment, the manipulating of the i and q signals include adding and subtracting them in a summer 215 and subtractor 213, respectively. The function of adding and subtracting the i and q channels result in two new in-phase and quadrature signals 45° and 135° away from the i channel. This finding may be mathematically proven as follows. In general, a received RF signal coupled from the antenna 202 is mixed with cos $(w_c t)$ and $-\sin(w_c t)$ to generate i and q signals at the outputs of mixers 204 and 208, respectively. When the received RF signal is represented as cos $(w_c t+q\ (t))$, the mixing operation may be mathematically described as:

$$i_m(t) = \cos(w_c t + q(t))\cos(w_c t) \quad (1)$$
$$= \frac{1}{2}[\cos(2w_c t + q(t)) + \cos(q(t))]$$

This signal is filtered via filters 210 and 214. The filtered signals are represented as:

$$i(t) = \cos(q(t)) \quad (2)$$
$$q(t) = \cos(q((t) - 90°)) \quad (3)$$
$$= \sin(q(t)) \quad (4)$$

The filtered signals are applied to zero-crossing generator 216 and limiters 220 and 222 before being coupled to a zero-crossing detector 228. These limiters provide zero crossing information on the i and q channels. The filtered signals are added and subtracted at 216 and 218, respectively to produce:

$$i_1(t) = \cos(q(t) - 45°) \quad (5)$$
$$q_1(t) = \cos(q((t) - 135°)) \quad (6)$$
$$= \sin(q(t) - 45°) \quad (7)$$

Note that the creation of these two additional components $i_1$ and $q_1$ is accomplished without any additional mixers, phase splitters, or low pass filters.

The generation of $i_1(t)$ and $q_1(t)$ may be mathematically explained using the following trigonometric equation.

$$\cos\alpha + \cos\beta = 2\cos((\tfrac{1}{2})(\alpha-\beta))\cos((\tfrac{1}{2})(\alpha+\beta)) \quad (8)$$

Using this relationship, $i_1(t)$ may be expressed as:

$$i_1(t) = (\cos((\theta(t))) + \cos(\theta(t) - 90°)) \quad (9)$$

Equation 9, may be expressed in terms of $i_1(t)$ and $q_1(t)$ using Equations 2 and 3:

$$i_1(t) = (i(t) + q(t)) \quad (10)$$

Similarly, $q_1$ may be generated using the following equation:

$$q_1(t) = (-i(t) + q(t)) \quad (11)$$

Equations 10 and 11 indicate that $i_1(t)$ and $q_1(t)$ may be generated by summing and subtracting i (t) and q (t). It is noted that the output of the adder 215 and subtractor 213 produce unsealed signals. This result is produced since the i and q signals are added in the form of vectors. This function could simply be accomplished via appropriate amplification and/or attenuation in the summer 215 and subtractor 213.

The second in-phase $i_1(t)$ and quadrature $q_1(t)$ components result in additional zero crossings. The outputs of the summer 215 and the subtractor 213 are coupled to the zero-crossing detector 222 via limiters 218 and 219, respectively. These limiters work in conjunction with limiters 217 and 220 to provide the detector 228 with a total of four phase signals which are used to detect additional zero crossings therein. The detection of zero crossings may be accomplished via D flip flops having a clock input with an edge trigger.

A benefit of generating additional zero crossings using the zero crossing generator 216 is the elimination of additional mixers, phase shifters and filters as suggested by the prior art. The elimination of these additional components results in significant current savings which is highly desired in portable communication devices. The summer and the subtractor which provide the additional in-phase and quadrature components are traditionally low current consuming devices as compared to mixers.

Similar to the operation of the device 100, the detected zero crossings are used by a phase angle estimator 226 and a decision device 228 to determine the content of the information signal. The information signal is further decoded at a controller 126 which proceeds to present the information to a speaker 128 and/or display 130 in accordance with its contents.

In summary, a mechanism has been described whereby a multi-level digital signal could be demodulated using zero crossings of i and q signals. A detector detects zero crossings by monitoring the phase rotation. The phase rotation angle is then monitored at each zero crossings for instantaneous phase direction. The instantaneous direction of all the phase rotations are then combined to create an overall phase rotation angle. A bi-directional counter keeps track of all the zero crossings along with their directions in order to estimate the signal. The significance of this method is that it requires significantly fewer components to realize the same conclusions. It is no longer necessary to use analog to digital converters, multipliers, or differentiators. A simple counter and a zero crossing detector is all that is needed to accomplish this task.

What is claimed is:

1. A communication device for receiving an information signal, comprising:

a first mixer for producing a first in-phase component;

a second mixer for producing a first quadrature phase component;

a multi-level detector for detecting the contents of the information signal using the in-phase and quadrature components, the detector comprising:

means for detecting the direction of instantaneous phase rotation at zero crossings;

a bi-directional counter for incrementing when a positive direction is detected and decrementing when a negative direction is detected; and means for extrapolating the contents of the information signal from the counter.

2. The communication device of claim 1, further including means for manipulating the first in-phase and quadrature components to produce additional zero crossings by generating at least a second in-phase component and a second quadrature phase component.

3. The communication device of claim 2, wherein the means for detecting includes a zero crossing detector for detecting zero crossings using the first in-phase and quadrature components and the second in-phase and quadrature components.

4. The communication device of claim 2, wherein the means for manipulating includes at least one summer.

5. The communication device of claim 2, wherein the means for manipulating includes at least one subtractor.

6. The communication device of claim 1, further including first and second low pass filters coupled to the first and second mixers, respectively.

7. The communication device of claim 1, further including an antenna.

8. The communication device of claim 7, further including a coupler for coupling the antenna to the first and second mixers.

9. The communication device of claim 8, wherein the coupler includes a first frequency down converter to render the communication device a dual conversion zero IF device.

10. A method for detecting the contents of an information signal, comprising the steps off generating an IF signal having in-phase and quadrature components;

monitoring the phase rotation in order to detect zero crossings;

establishing the instantaneous direction of the phase rotation at each of the zero crossings;

combining all the instantaneous directions of the phase rotation to create an overall phase rotation angle; and estimating the contents of the information signal using the overall phase rotation angle.

11. The method of claim 10, further including the step of manipulating the in-phase and quadrature components to produce additional zero crossings.

12. The method of claim 11, wherein the step of manipulating includes the step of adding the in-phase and quadrature phase components together.

13. The method of claim 11, wherein the step of manipulating includes the step of subtracting the in-phase and quadrature phase components from each other.

14. A method for detecting the contents of an information signal, comprising the steps of:

generating an IF signal having in-phase and quadrature components;

monitoring the in-phase and quadrature components to determine instantaneous phase rotation direction at zero crossings;

incrementing a bi-directional counter when a positive direction is detected and decrementing the counter when a negative direction is detected;

estimating the overall phase rotation angle using the output of the bi-directional counter; and converting the phase rotation angle to detect the contents of the information signal.

* * * * *